(12) United States Patent
Toishi (10) Patent No.: US 7,248,389 B2
(45) Date of Patent: Jul. 24, 2007

(54) HOLOGRAPHIC RECORDING AND RECONSTRUCTING APPARATUS AND HOLOGRAPHIC RECORDING AND RECONSTRUCTING METHOD

(75) Inventor: Mitsuru Toishi, Tokyo (JP)

(73) Assignee: Sony Corporation (JP)

( * ) Notice: Subject to any disclaimer, the term of this patent is extended or adjusted under 35 U.S.C. 154(b) by 33 days.

(21) Appl. No.: 11/325,037

(22) Filed: Jan. 4, 2006

(65) Prior Publication Data
US 2006/0176532 A1    Aug. 10, 2006

(30) Foreign Application Priority Data
Jan. 6, 2005    (JP)    ............................ P2005-001227

(51) Int. Cl.
*G03H 1/26* (2006.01)
(52) U.S. Cl. ............................ 359/22; 359/24; 359/32; 369/103; 365/125
(58) Field of Classification Search ................ 359/22, 359/24, 25, 32, 33, 35; 369/103; 365/125, 365/216
See application file for complete search history.

(56) References Cited

U.S. PATENT DOCUMENTS

| | | | | |
|---|---|---|---|---|
| 5,978,112 A | * | 11/1999 | Psaltis et al. | 359/22 |
| 6,320,683 B1 | * | 11/2001 | Ito et al. | 359/22 |
| 6,738,337 B2 | * | 5/2004 | Xu et al. | 369/103 |

FOREIGN PATENT DOCUMENTS

JP    11-242424 A    9/1999

* cited by examiner

*Primary Examiner*—Leonidas Boutsikaris
(74) *Attorney, Agent, or Firm*—Lerner, David, Littenberg, Krumholz & Mentlik, LLP (57) ABSTRACT

A holographic recording and reconstructing apparatus includes a laser light source for emitting a laser beam, a beam splitting element for splitting the emitted laser beam into a signal beam and a reference beam, a light modulating element for modulating the signal beam, an optical system for collecting the modulated signal beam and the reference beam onto a reflection hologram recording medium at substantially the same location, a light detection element for detecting a reconstructed light beam from the hologram recording medium, and wavelength shifting means for shifting the wavelength of the laser beam used during reconstruction from the wavelength used during recording.

9 Claims, 7 Drawing Sheets

HOLOGRAPHIC RECORDING AND RECONSTRUCTING APPARATUS AND HOLOGRAPHIC RECORDING AND RECONSTRUCTING METHOD

CROSS-REFERENCE TO RELATED APPLICATIONS

The present application claims priority from Japanese Patent Application No. JP 2005-001227 filed on Jan. 6, 2005, the disclosure of which is hereby incorporated by reference herein.

BACKGROUND OF THE INVENTION

The present invention relates to a holographic recording and reconstructing apparatus and a holographic recording and reconstructing method for recording and reconstructing information using a hologram and, in particular, to a holographic recording and reconstructing apparatus and a holographic recording and reconstructing method using a reflection hologram.

Recently, holographic recording and reconstructing apparatuses for recording data using holography have been developed.

In holographic recording, a modulated signal beam (i.e., light overlaid with data) and a non-modulated reference beam are generated from a laser beam. These two types of beams are incident onto the same location on a hologram recording medium. As a result, the signal beam interferes with the reference beam so that a diffraction grating (hologram) is generated at the irradiation point. Thus, data is recorded on the hologram recording medium.

By emitting the reference beam to the hologram recording medium, the recorded diffraction grating generates a diffracted beam (reconstructed beam). Since this reconstructed beam contains the data overlaid on the signal beam during recording, the recorded signal can be reconstructed by receiving the reconstructed beam using a light receiving element.

In some cases, to record a large amount of information on a hologram recording medium, a large number of holograms are formed on the hologram recording medium. In these cases, the holograms are not limited to being formed at different locations on the hologram recording medium. The holograms may be formed on the same location, or the holograms may be formed on the hologram recording medium so that parts of the holograms are overlaid. This is known as "angle multiplexing recording". Examples of the multiple recording method include a variety of recording methods, such as an angle multiplexing recording method, a multi-wavelength recording method, a rotational multiple recording method, and a collinear recording method.

For example, in an angle multiplexing recording method, a plurality of holograms is formed by a reference beam incident on the same location on a hologram recording medium while changing the angle of incidence. When reconstructing the holograms, by using a reference beam similar to a reference beam during recording, a reconstructed beam corresponding to each hologram (i.e. data) can be obtained.

Recently, a holographic recording apparatus that adopts a phase correlation multiple recording method, which is one of multiple recording methods, has been developed to increase the storage capacity (refer to, for example, Japanese Unexamined Patent Application Publication No. 11-242424).

A reflection hologram recording medium provides a variety of advantages over a transmission hologram recording medium. For example, a recording apparatus for a reflection hologram recording medium is expected to have a simpler optical system than that of a recording apparatus for a transmission hologram recording medium. In addition, a reflection hologram recording medium can use an existing servo technology, since the reflection hologram recording medium has an optical system similar to that of existing optical discs, such as a compact disc (CD) or a digital versatile disc (DVD). However, when a reflection hologram recording medium is used, the following four types of holograms are generated: a transmission hologram caused by interference between a signal beam and a reference beam, a transmission hologram caused by interference between a reflected signal beam and a reflected reference beam, a reflection hologram caused by a reflected signal beam and a reference beam, and a reflection hologram caused by a signal beam and a reflected reference beam.

The transmission hologram is formed in a direction perpendicular to the surface of the medium while the reflection hologram is formed in a direction parallel to the surface of the medium. Accordingly, for a medium that is subject to a dimension change, such as reduction, during recording (e.g., photopolymer), output angles of beams from the two holograms are shifted with respect to each other, and therefore, noise is generated.

Additionally, since the selectivities of the two holograms are different, the signal-to-noise ratio (SNR) is decreased. Accordingly, to obtain superior hologram reconstruction, it is desirable that a diffracted beam from the reflection hologram is removed to obtain only a diffracted beam from the transmission hologram.

To remove a diffracted beam from the reflection hologram, a $\lambda/4$ wavelength plate may be disposed between a reflecting film and a recording layer of the hologram recording medium so that a transmission beam and a reflection beam are polarized at right angle to each other. Thus, the interference is prevented. However, this method may increase the cost of the medium.

Accordingly, there is a need for a holographic recording and reconstructing apparatus and a holographic recording and reconstructing method capable of preventing the occurrence of a diffracted beam from a reflection hologram and obtaining only a diffracted beam from a transmission hologram so as to increase the SNR.

SUMMARY OF THE INVENTION

According to an embodiment of the present invention, a holographic recording and reconstructing apparatus includes a laser light source for emitting a laser beam; a beam splitting element for splitting the emitted laser beam into a signal beam and a reference beam; a light modulating element for modulating the signal beam; an optical system for collecting the modulated signal beam and the reference beam onto a reflection hologram recording medium at substantially the same location; a light detection element for detecting a reconstructed light beam from the hologram recording medium; and wavelength shifting means for shifting the wavelength of the laser beam used during reconstruction from the wavelength used during recording by a shift amount $\Delta\lambda$.

According to the embodiment of the present invention, by reconstructing information using a laser beam having a wavelength shifted from that used during recording based on the difference between wavelength selectivities of a transmission hologram and a reflection hologram, a holographic recording and reconstructing apparatus can prevent the occurrence of a diffracted beam from a reflection hologram and can obtain only a diffracted beam from a transmission hologram.

In the holographic recording and reconstructing apparatus, the shift amount $\Delta\lambda$ of the wavelength of the laser beam used during reconstruction from the wavelength used during recording can satisfy the following relation:

$$(-\lambda_0^2/(\lambda_0+2nL\cos\theta))<\Delta\lambda<((-\lambda_0^2\cos\theta)/(\lambda_0\cos\theta+2nL\sin^2\theta))$$

where $\lambda_0$ is the wavelength used during recording, $\theta$ is the angle of incidence of the reference beam, L is the thickness of the hologram recording medium, and n is the index of refraction of the hologram recording medium.

That is, by reconstructing information using a wavelength between the selectivities of a transmission hologram and a reflection hologram, the occurrence of a diffracted beam from a reflection hologram can be prevented and only a diffracted beam from a transmission hologram can be obtained more reliably. As a result, the SNR can be improved.

According to the embodiment of the present invention, the light detection element can be disposed while being spatially shifted in accordance with the shift amount $\Delta\lambda$. Thus, a positional shift of an image on the light detection element caused by the wavelength shift can be prevented.

According to the embodiment of the present invention, a margin of the number of pixels of the light detection element can be set in accordance with the shift amount $\Delta\lambda$. Thus, even when the wavelength of the beam is shifted, the light detection element can detect all the reconstructed beams.

According to the embodiment of the present invention, the holographic recording and reconstructing apparatus can include means for changing the angle of the reference beam; and means for moving the light detection element in accordance with the angle of incidence of the beam incident on the hologram recording medium during reconstruction. Thus, in an angle multiplexing recording mode, a positional shift of an image on the light detection element between the angles of incidence of a beam caused by the wavelength shift can be prevented.

As described above, according to an embodiment of the present invention, a holographic recording and reconstructing apparatus and a holographic recording and reconstructing method can be provided that are capable of preventing the occurrence of a diffracted beam from a reflection hologram and obtaining only a diffracted beam from a transmission hologram so as to increase the SNR.

DETAILED DESCRIPTION

Exemplary embodiments of the present invention are now herein described with reference to the accompanying drawings.

Figure 1:
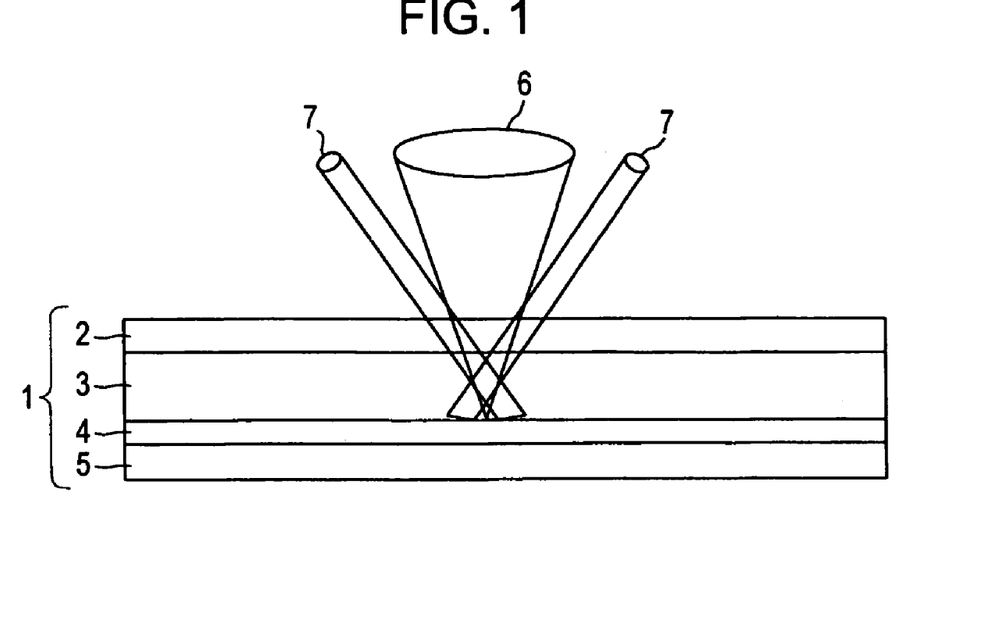
FIG. 1 illustrates a reflection hologram recording medium, and a reference beam and a signal beam incident on the hologram recording medium.

FIG. 1 illustrates a reflection hologram recording medium, and a reference beam and a signal beam incident on the hologram recording medium. As shown in FIG. 1, a reflection hologram recording medium 1 includes a front substrate 2, a holographic recording layer 3, a reflecting layer 4, and a rear substrate 5. The front substrate 2 and the rear substrate 5 are attached to either outer side of the hologram recording medium 1 to serve as protective layers. The holographic recording layer 3 and the reflecting layer 4 are disposed between the front substrate 2 and the rear substrate 5. The reflecting layer 4 is bonded to the rear surface of the holographic recording layer 3. In this example, a signal beam 6 and a reference beam 7 are incident on the hologram recording medium 1 from the front substrate 2 side. Two of the reference beams 7 are incident on either side of the signal beam 6.

In the reflection hologram recording medium 1 having such a structure, recording is performed by generating a combination of the following holograms:
  (a) a transmission hologram generated by a transmissive component of a signal beam and a transmissive component of a reference beam,
  (b) a transmission hologram generated by a reflecting component of a signal beam and a reflecting component of a reference beam,
  (c) a reflection hologram generated by a reflecting component of a signal beam and a transmissive component of a reference beam, and
  (d) a reflection hologram generated by a transmissive component of a signal beam and a reflecting component of a reference beam.

That is, by adding diffracted beams from these holograms, a signal can be reconstructed.

Figure 2:
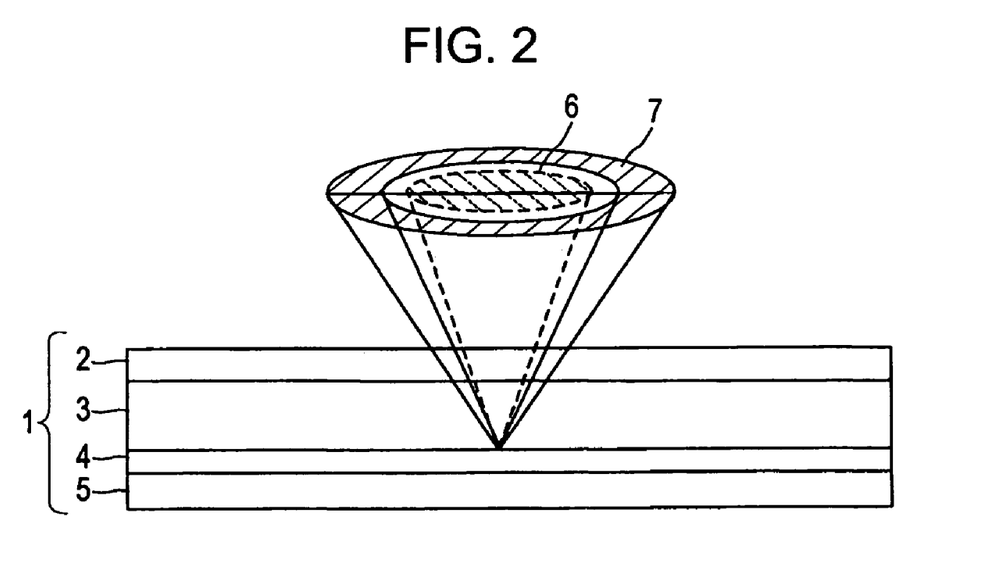
FIG. 2 illustrates a reference beam and a signal beam incident on a hologram recording medium in a collinear method.

This phenomenon appears in a collinear method in which the reference beam 7 is incident so that the reference beam 7 surrounds the signal beam 6, as shown in FIG. 2, The transmission hologram is generated in a direction perpendicular to the surface of a medium, while the reflection hologram is generated in a direction parallel to the surface of a medium. Accordingly, in a medium in which a dimensional change, such as reduction, occurs while being recorded (e.g., photopolymer), the output angles of the two holograms are shifted to each other, and therefore, noise is generated.

Due to the difference between the selectivities of the two holograms, the signal to noise ratio (SNR) is decreased. Accordingly, to obtain a superior hologram reconstruction, a diffracted beam is removed from the reflection hologram so that only a diffracted beam from the transmission hologram is obtained.

Figure 3:
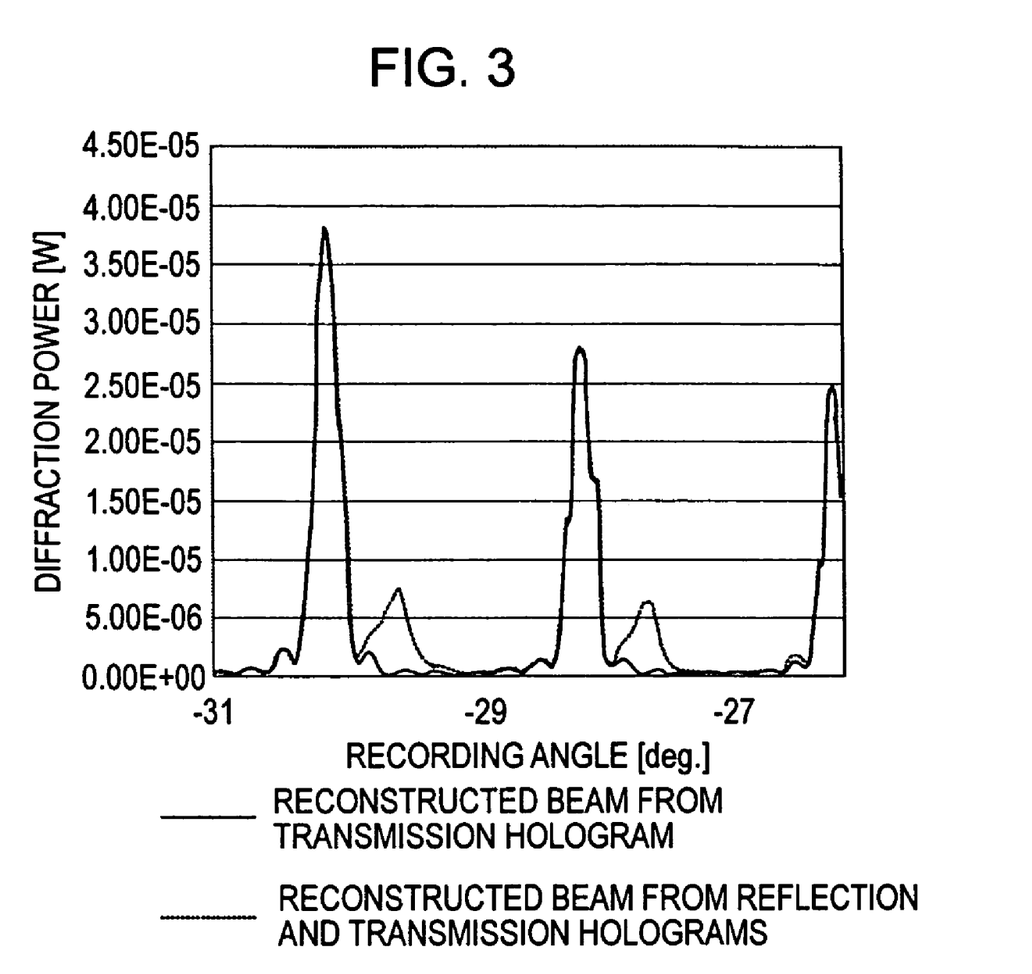
FIG. 3 illustrates an angle distribution of a reconstructed beam when both a transmission hologram and a reflection hologram are recorded at the same time.
Figure 4:
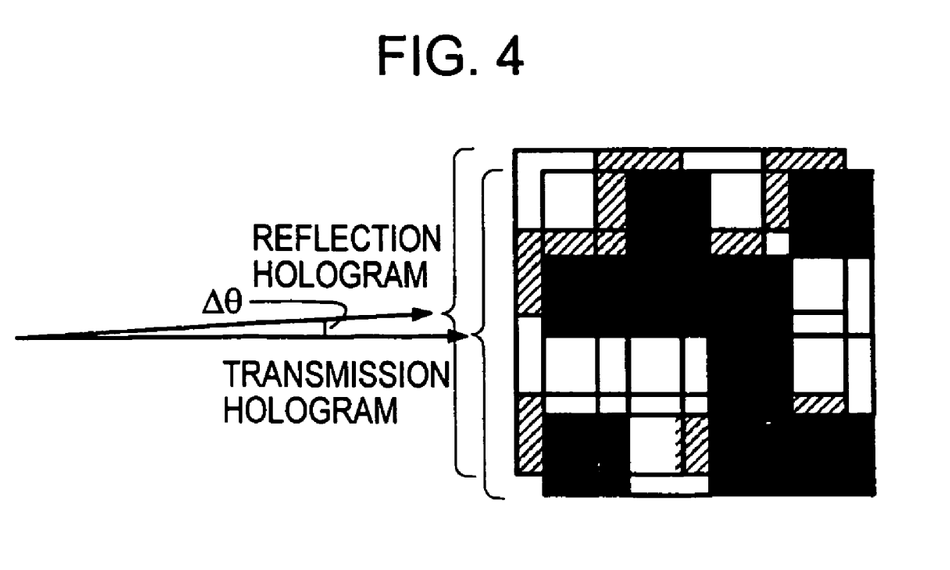
FIG. 4 illustrates a positional shift of an image when the angle of a reconstructed beam from a transmission hologram is different from that from a reflection hologram.

FIG. 3 illustrates an angle distribution of a reconstructed beam when both a transmission hologram and a reflection hologram are recorded at the same time. In the drawing, a solid line represents a reconstructed beam from only the transmission hologram while a dotted line represents a reconstructed beam from both reflection hologram and transmission hologram. When a beam is reconstructed from both the reflection hologram and transmission hologram, a small peak appears beside the main peak. This part becomes a diffracted beam from the reflection hologram. As described above, when the angles of reconstructed beams from the reflection hologram and transmission hologram are different, the positions of both images are shifted to each other on a charge coupled device (CCD) camera, as shown in FIG. 4, even when the same information is diffracted from the both holograms. As a result, noise is generated.

A method for eliminating diffracted light from a reflection hologram by using a difference between the wavelength selectivities of a transmission hologram and the reflection hologram is now herein described.

Figure 5:
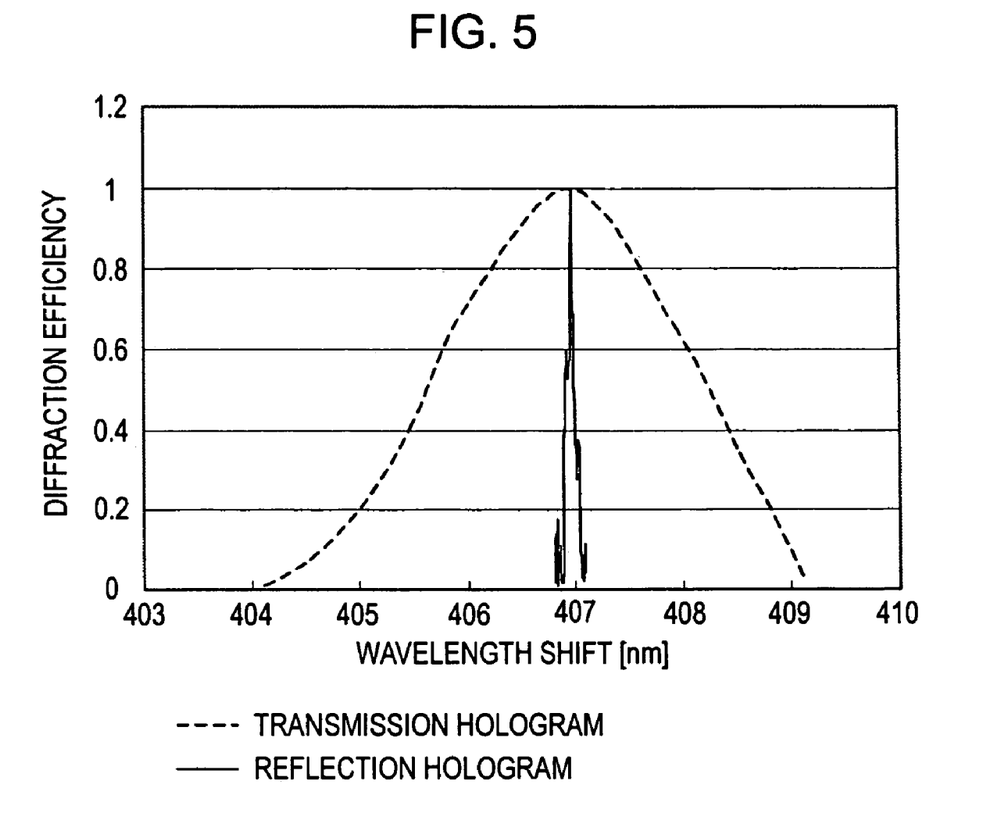
FIG. 5 illustrates the wavelength selectivity of a transmission hologram and a reflection hologram.

In general, the wavelength selectivity of a reflection hologram is very strict compared with that of a transmission hologram. FIG. 5 illustrates a change in diffraction efficiency when a hologram is recorded at a wavelength of 407 nm and a wavelength is shifted during a reconstruction time. For a transmission hologram, when a wavelength is shifted ±2 nm to ±3 nm, the diffraction efficiency approaches zero. While, for a reflection hologram, even when a wavelength is shifted about ±0.2 nm to ±0.3 nm, the diffraction efficiency becomes zero. That is, as can be seen from these characteristics, in a holographic recording and reconstructing apparatus, if the wavelength for reconstruction is shifted 0.2 nm to 0.3 nm from that for recording at all times, the diffracted beam is not virtually generated from a reflection hologram, but only a diffracted beam is generated from a transmission hologram. However, if the wavelength for reconstruction is shifted more than 2 nm to 3 nm from that for recording, a diffracted beam is not generated from a transmission hologram. Consequently, it is desirable that the holograms are reconstructed using a wavelength in the range of a wavelength selectivity of the transmission hologram to a wavelength selectivity of the reflection hologram, namely, using a wavelength that can be reconstructed by the transmission hologram and that cannot be reconstructed by the reflection hologram.

The wavelength range to be shifted is now herein described.

The widths $\lambda\lambda_T$ and $\Delta\lambda_R$ by which the wavelengths of the laser beams need to be shifted for a transmission hologram and a reflection hologram until the diffracted beams from the transmission hologram and the reflection hologram reach zero for the first time are expressed by the following equations, respectively:

The wavelength selectivity of a transmission hologram $$\Delta\lambda_T = \lambda_0^2/(\lambda_0 \cos\theta + 2nL \sin^2\theta)$$

The wavelength selectivity of a reflection hologram $$\Delta\lambda_R = \lambda_0^2 \cos\theta/(\lambda_0 \cos\theta + 2nL \sin^2\theta),$$

where $\lambda_0$ is the wavelength used for the transmission hologram or reflection hologram, $\theta$ is the angle of incidence of the reference beam, L is the thickness of a medium, and n is a diffraction ratio of the medium. Accordingly, the wavelength shift width $\Delta\lambda$ needs to satisfy the following inequality:

$$\Delta\lambda_R < \Delta\lambda < \Delta\lambda_T$$

Here, since the wavelength shift width $\Delta\lambda$ of a value near $\Delta\lambda_T$ increases the attenuation of the diffracted beam from the transmission hologram and causes the angle shift of the diffraction of the transmission hologram, the wavelength shift is needed to be as close to $\Delta\lambda_R$ as possible.

By shifting the wavelength by $\Delta\lambda$, the information can be reconstructed using only the transmission hologram without the need to reconstruct the reflection hologram. However, the shift of the wavelength affects the transmission hologram in terms of the following two points:

Firstly, the diffraction efficiency is attenuated. However, the attenuance for a transmission hologram is very low compared with that for the reflection hologram. Accordingly, this is not a serious problem;

Secondly, the shift of the wavelength causes a shift from the Bragg diffraction condition, and therefore, the diffraction angle is shifted. The angle shift of the beam outside the medium is expressed as follows:

$$\Delta\theta_{outside} = \arcsin\left[n \cdot \sin\left(\arcsin\left(\frac{\lambda + \Delta\lambda}{n\Lambda}\right) - \theta_B\right)\right]$$

where $\Delta\lambda$ is the shift of the wavelength, and $\theta_B$ is the original readout angle (the angle when the Bragg diffraction condition is satisfied).

In a Fourier optical system, the shift of the angle generates the shift of position on a real image surface (on a CCD camera). Therefore, the position of the CCD camera is spatially shifted in accordance with the amount of wavelength shift. Thus, the positional shift of an image in an image capturing area of the CCD camera, which is caused by the wavelength shift of the beam, can be prevented. Additionally, a margin required for the image capturing area (the number of pixels of a light sensitive element) of the CCD camera may be maintained in accordance with the amount of wavelength shift. Thus, even when the wavelength of the beam is shifted, the CCD camera can detect all the reconstructed beams.

A hologram recording and reconstructing apparatus according to the first embodiment of the present invention is now herein described.

Figure 6:
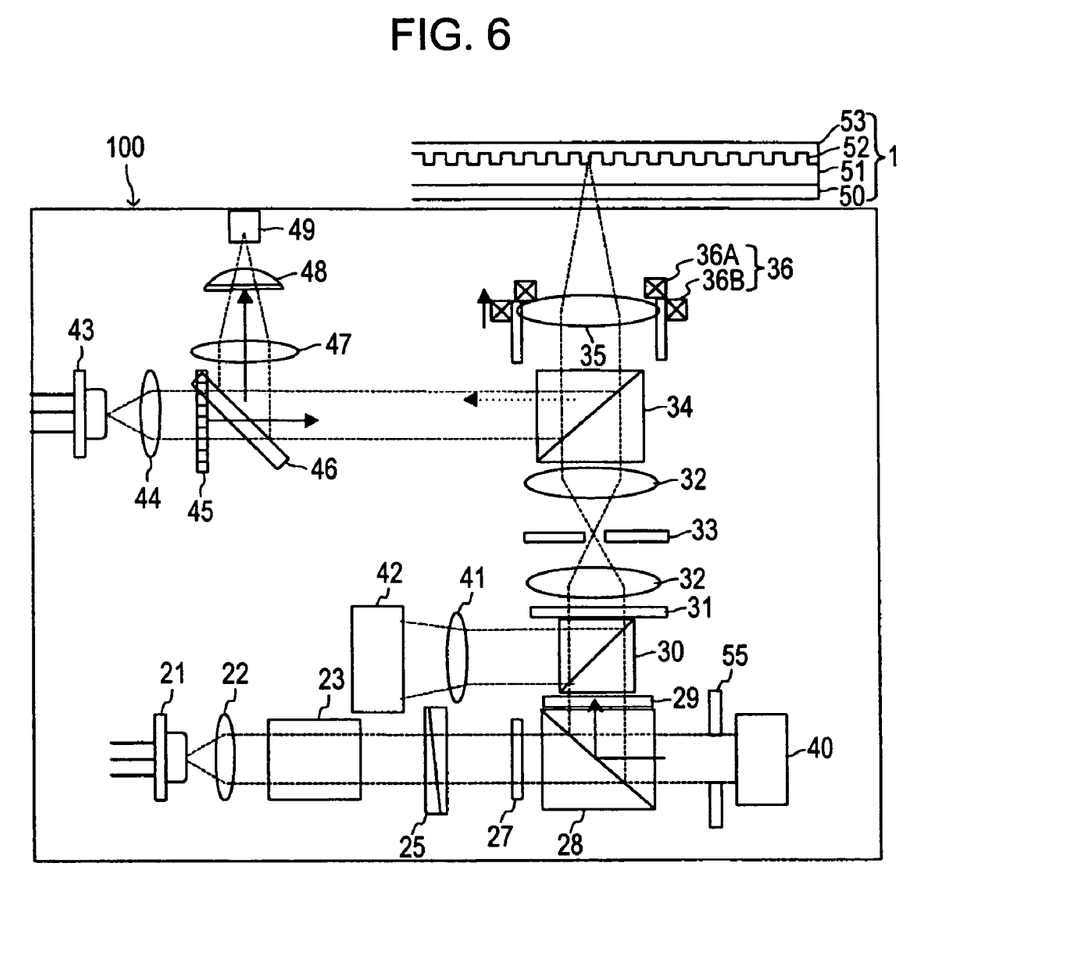
FIG. 6 is a block diagram of an optical unit of a collinear hologram recording and reconstructing apparatus.

FIG. 6 is a block diagram of an optical unit of a collinear hologram recording and reconstructing apparatus.

As shown in FIG. 6, an optical unit 100 of the collinear hologram recording and reconstructing apparatus includes a recording and reconstructing light source 21, a collimating lens 22, an isolator 23, a mechanical shutter 25, a ½ wavelength plate 27, a polarizing beam splitter 28, a ½ wavelength plate 29, a polarizing beam splitter 30, a ¼ wavelength plate 31, a relay lens 32, a pin hole 33, a dichroic mirror 34, an objective lens 35, a servo driving unit 36, a pin hole 55, a reflective liquid crystal 40, a magnification zoom lens 41, a CCD camera 42, a servo light source 43, a collimating lens 44, a grating 45, a beam splitter 46, a condenser lens 47, a cylindrical lens 48, and a light receiving element 49.

The recording and reconstructing light source 21 is a laser light source that can vary the wavelength of an output beam. A laser element of the laser light source is, for example, a laser diode (LD) having a wavelength of 405 nm or an Nd-YAG laser having a wavelength of 532 nm.

The collimating lens 22 is an optical element that converts laser beams emitted from the recording and reconstructing light source 21 to collimated light beams.

The isolator 23 is an optical element that blocks a returning beam.

The mechanical shutter 25 is an optical element that opens and closes the beam line. The ½ wavelength plate 27 is an optical element that adjusts the beam intensity. The polarizing beam splitter 28 is an optical element that causes only a p-polarized light component of the beam passing through the ½ wavelength plate 27 to enter the reflective liquid crystal 40 serving as a spatial light modulator and that reflects a returning beam from the reflective liquid crystal 40.

The ½ wavelength plate 29 is an optical element that causes the light beam reflected by the polarizing beam splitter 28 to return to p-polarized light.

The polarizing beam splitter 30 is an optical element that allows a light beam incident from the ½ wavelength plate 29 to pass therethrough and reflects a light beam (reconstructed light beam) reflected by the hologram recording medium 1 and passing through the ¼ wavelength plate 31.

The ¼ wavelength plate 31 is an optical element that circularly polarizes a light beam incident from the polarizing beam splitter 30.

The relay lens 32 is an optical element that passes an image pattern provided on the reflective liquid crystal 40 serving as a spatial light modulator to a pre-focus surface of the objective lens 35.

The pin hole 33 is an optical element that decreases the diameter of a signal beam so as to cut off high-order diffraction light from the reflective liquid crystal 40.

The dichroic mirror 34 is an optical element that equalizes a light path of a beam used for recording and reconstruction (a laser beam from the recording and reconstructing light source 21) to a light path of a servo beam (a laser beam from the servo light source 43). Using the fact that the wavelength of the laser beam from the recording and reconstructing light source 21 is different from that from the servo light source 43, the dichroic mirror 34 allows the recording and reconstructing light beam from the recording and reconstructing light source 21 to pass therethrough and reflects the servo light beam from the servo light source 43.

The objective lens 35 is an optical element that collects the signal beam and the reference beam onto the hologram recording medium 1.

The servo driving unit 36 is a driving mechanism that controls tracking and focusing of the objective lens 35 by driving the objective lens 35 in two axis directions on the basis of a tracking error signal and a focusing error signal from the light receiving element 49. The servo driving unit 36 includes coils 36A and 36B for driving the objective lens 35 in the two axis directions, respectively.

The reflective liquid crystal 40 is a spatial light modulator that modulates the signal beam spatially (two-dimensionally in this embodiment) so as to overlay data on the signal beam. As well as the reflective liquid crystal, a Digital Micromirror Device (DMD) or a transmissive liquid crystal element, which is an element of a transmissive type, may be used as a spatial light modulator.

The magnification zoom lens 41 is an optical element that magnifies the reconstructed beam reflected by the polarizing beam splitter 30 and incident thereon so as to coincide with the pixel size of the CCD camera 42. In terms of the magnification of pixel matching between the reflective liquid crystal 40 serving as a spatial light modulator and the CCD camera 42, a pixel of the CCD camera 42 may receive a pixel on the spatial light modulator, or the CCD camera 42 may perform oversampling to four pixels or more.

The CCD camera 42 is a device to receive an image of the reconstructed beam.

The servo light source 43 is a light source that is used to control servos, such as a tracking servo and a focusing servo. The servo light source 43 emits a laser beam having a wavelength different from that of the recording and reconstructing light source 21. For example, the servo light source 43 is a laser diode, which has an oscillating wavelength having a small sensitivity to the hologram recording medium 1. For example, the servo light source 43 uses a wavelength of 650 nm. The collimating lens 44 is an optical element that converts laser beams emitted from the servo light source 43 to parallel laser beams.

The grating 45 is an optical element that divides a laser beam output from the collimating lens 44 into three laser beams. The grating 45 includes two elements. The laser beam is divided to perform a servo control.

The beam splitter 46 is an optical element that allows the laser beam output from the grating 45 to pass therethrough and reflects a returning beam reflected by the hologram recording medium 1.

The condenser lens 47 is an optical element that collects the returning beams from the beam splitter 46 onto the light receiving element 49.

The cylindrical lens 48 is an optical element that converts the shape of the beam output from the condenser lens 47 from a circular shape to an elliptical shape.

The light receiving element 49 is a device that receives the returning light beam and outputs a tracking error signal for controlling a tracking servo and a focus error signal for controlling a focusing servo. The light receiving element 49 includes, for example, a CCD.

The hologram recording medium 1 is rotated by a spindle motor (not shown). Since the hologram recording medium 1 moves, recording and reconstruction are performed on the hologram recording medium 1 along tracks formed in a moving direction of the hologram recording medium 1.

The hologram recording medium 1 includes a protective layer 50, a recording layer 51, a groove 52, and a reflecting layer 53 so as to record interference fringes caused by a signal beam and a reference beam. Here, the protective layer 50 protects the recording layer 51 from the external environment. The recording layer 51 records interference fringes in the form of changes in the refractive index (or the transmission factor). Any material, either organic or inorganic, whose refractive index (or transmission factor) changes in accordance with the intensity of beam can be used for the recording layer 51. Examples of the inorganic material include a photo-reflective material, such as lithium niobate (LiNbO3), which changes the refractive index in accordance with an exposure amount due to an electrooptic effect. Examples of the organic material include a photopolymer. In an initial state of the photopolymer, monomers are dispersed in a matrix polymer. When the monomers are irradiated with light, the monomers are photopolymerized in areas exposed to the light (exposure areas). As the monomers are photopolymerized, other monomers move from the periphery, and therefore, the density of the monomers changes depending on the locations. As described above, by using the fact that the refractive index (or transmission factor) of the recording layer 51 changes depending on the amount of exposure, interference fringes caused by the interference between the reference beam and the signal beam can be recorded on the hologram recording medium 1 as a change in the refractive index (or transmission factor) of the recording layer 51.

The operation of the hologram recording and reconstructing apparatus is now herein described.

A light beam having a wavelength λ emitted from the recording and reconstructing light source 21 becomes parallel beams by the collimating lens 22, which pass through the isolator 23 to prevent the returning beam. Thereafter, the intensity of the beam is adjusted by a ½ wavelength plate 27. Subsequently, only a p-polarized component of the beam is incident on the reflective liquid crystal 40 serving as a spatial light modulator via the polarizing beam splitter 28.

Here, a pattern in which a data area of the reference beam surrounds a data area of the signal beam is projected onto the reflective liquid crystal 40. In this embodiment, the signal beam and the reference beam are propagated in the same path. However, conversely, a pattern in which a data area of the signal beam surrounds a data area of the reference beam may be projected onto the reflective liquid crystal 40. Furthermore, a pattern in which the reference beams on the both sides of a pattern of the signal beam are incident on the reflective liquid crystal 40 may be used.

Since a polarized light beam of a light beam modulated by the reflective liquid crystal 40 is rotated 90°, the polarized light beam is reflected by the polarizing beam splitter 28. The light beam reflected by the polarizing beam splitter 28 is returned to a p-polarized light beam again by the ½ wavelength plate 29. The p-polarized light beam passes through the polarizing beam splitter 30 and is then polarized to a circularly-polarized light beam by the ¼ wavelength plate 31. The circularly-polarized light beam is propagated through the relay lens 32. At that time, high-order diffracted light from the reflective liquid crystal 40 is cut off by the pin hole 33.

Subsequently, the light beam passes through the dichroic mirror 34. The light beam is then collected by the objective lens 35 and is incident on the hologram recording medium 1. As a result, interference fringes are formed on the hologram recording medium 1. At that time, information spatially modulated by the reflective liquid crystal 40 is recorded in the form of a hologram on the hologram recording medium 1.

Here, the pattern of the reference light beam is modulated to a predetermined intensity. The pattern generates a speckle in the hologram recording medium 1. Since the areas having the same speckle generate a reconstructed light beam, a multiple recording is possible with a very fine shift pitch depending on the speckle size.

During reconstruction, a light beam whose wavelength is offset by $\Delta\lambda$ from a wavelength $\lambda$ used for the recording is emitted from the recording and reconstructing light source 21. Here, $\Delta\lambda$ is a value that satisfies the above-described conditions. Only a pattern corresponding to the reference beam is displayed on the reflective liquid crystal 40, and only the reference beam component is incident on the hologram recording medium 1. Consequently, a diffracted light beam (reconstructed light beam) is generated from a hologram recorded on the hologram recording medium 1. The reconstructed light beam travels along the optical path of the signal beam in the opposite direction. The reconstructed light beam passes through the objective lens 35, the dichroic mirror 34, and the relay lens 32. While passing through the relay lens 32, noise is removed by the pin hole 33. Subsequently, the reconstructed light beam is polarized into an S-polarized light beam by the ¼ wavelength plate 31 and is reflected by the polarizing beam splitter 30. The magnification of the reconstructed light beam is then adjusted by the magnification zoom lens 41. Thereafter, the reconstructed light beam is converted to an electrical signal corresponding to spatial two-dimensional data on the reflective liquid crystal 40 by the CCD camera 42. The output of the CCD camera 42 is digitized by a signal processing unit (not shown) into time-series binary data.

The CCD camera 42 is disposed at a position offset by a positional shift amount caused by a wavelength shift of the light beam in advance. Since positional shift amounts for multi-recorded holograms are the same, the CCD camera 42 can be disposed at a fixed position. Thus, a positional shift of an image on the CCD camera 42 caused by a wavelength shift of the light beam can be prevented.

In contrast, the servo light source 43 is a light source for controlling servos, such as a tracking servo and a focusing servo. The servo light source 43 emits a laser beam having a wavelength different from that of the recording and reconstructing light source 21. The light beam for the servo emitted from the servo light source 43 is converted to a parallel light beam by the collimating lens 44 and is divided into three light beams by the grating 45. A laser beam output from the grating 45 passes through the beam splitter 46 and reaches the dichroic mirror 34. The laser beam is directed into the same optical path as that of the recording and reconstructing light beam by the dichroic mirror 34, and is made incident on the hologram recording medium 1 by the objective lens 35.

The servo beam reflected by the hologram recording medium 1 passes through the objective lens 35 and returns to the dichroic mirror 34. The servo beam is reflected by the dichroic mirror 34 and returns to the beam splitter 46. The returning servo beam is reflected by the beam splitter 46 and is made incident on the condenser lens 47. The servo beam is collected by the condenser lens 47. Subsequently, the shape of the servo beam is converted from a circle to an eclipse by the cylindrical lens 48 and the servo beam is received by the light receiving element 49. The light receiving element 49 outputs a tracking error signal for controlling a tracking servo and a focusing error signal for controlling a focusing servo with respect to the returning beam.

A hologram recording and reconstructing apparatus according to a second embodiment of the present invention is now herein described.

Figure 7:
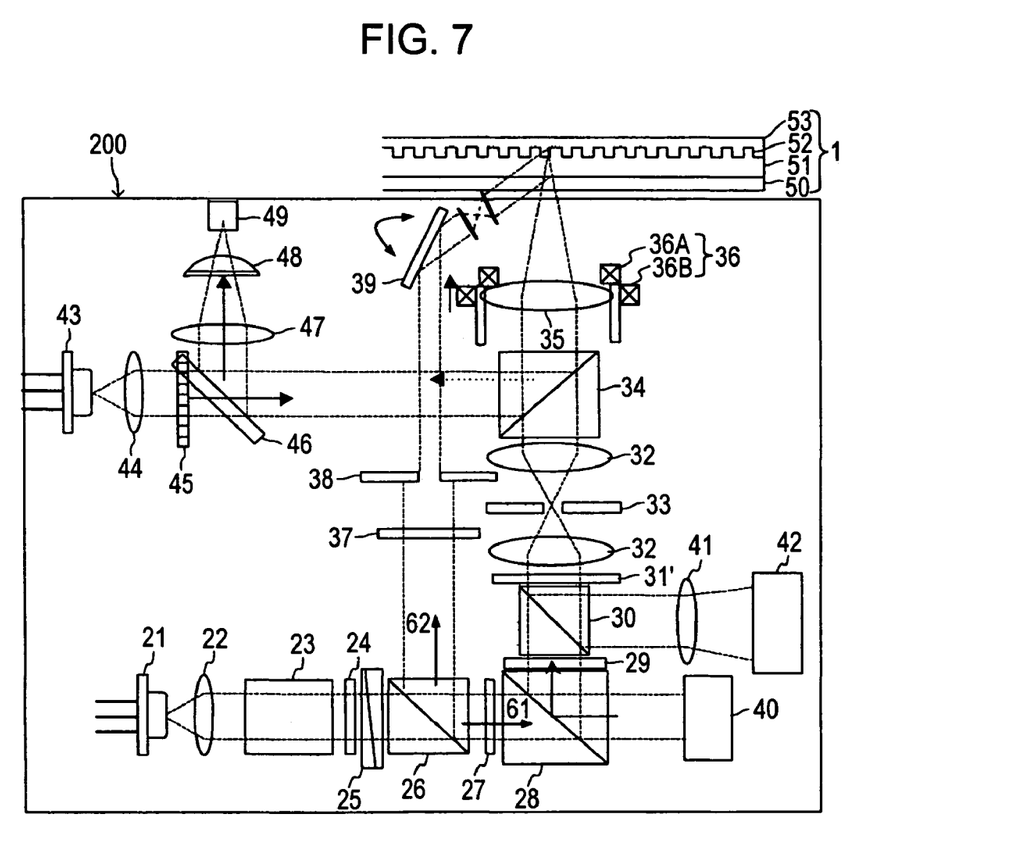
FIG. 7 is a block diagram of an optical unit of a multi-angle hologram recording and reconstructing apparatus.

FIG. 7 is a block diagram of an optical unit of a multi-angle hologram recording and reconstructing apparatus.

An optical unit 200 of the multi-angle hologram recording and reconstructing apparatus includes a recording and reconstructing light source 21, a collimating lens 22, an isolator 23, a ½ wavelength plate 24, a mechanical shutter 25, a polarizing beam splitter 26, a ½ wavelength plate 27, a polarizing beam splitter 28, a ½ wavelength plate 29, a polarizing beam splitter 30, a ½ wavelength plate 31', a relay lens 32, a pin hole 33, a dichroic mirror 34, an objective lens 35, a servo driving unit 36, a ½ wavelength plate 37 for a reference beam, a pin hole 38 for a reference beam, a galvanometer mirror 39, a reflective liquid crystal 40, a magnification zoom lens 41, a CCD camera 42, a servo light source 43, a collimating lens 44, a grating 45, a beam splitter 46, a condenser lens 47, a cylindrical lens 48, and a light receiving element 49.

The recording and reconstructing light source 21 is a laser light source that can vary the wavelength of an output beam. A laser element of the laser light source is, for example, a laser diode (LD) having a wavelength of 405 nm or an Nd-YAG laser having a wavelength of 532 nm.

The collimating lens 22 is an optical element that is used to convert laser beams emitted from the recording and reconstructing light source 21 to collimated light beams.

The isolator 23 is an optical element that is used to block a returning beam.

The ½ wavelength plate 24 is an optical element that is used to control the ratio of p-polarized light beam to s-polarized light beam received from the isolator 23.

The mechanical shutter 25 is an optical element that is used to open and close the beam line. The polarizing beam splitter 26 is an optical element that is used to divide a light beam into p-wave signal beam line 61 and s-wave reference beam line 62.

The ½ wavelength plate 27 is an optical element that is used to adjust the beam intensity.

The polarizing beam splitter 28 is an optical element that causes only a P-polarized light component of the beam passing through the ½ wavelength plate 27 to enter the reflective liquid crystal 40 serving as a spatial light modulator, and reflects a returning beam from the reflective liquid crystal 40.

The ½ wavelength plate 29 is an optical element that causes the light beam reflected by the polarizing beam splitter 28 to return to P-polarized light.

The polarizing beam splitter 30 is an optical element that allows a light beam incident from the ½ wavelength plate 29 to pass therethrough and reflects a light beam (reconstructed light beam) reflected by the hologram recording medium 1 and passing through the ½ wavelength plate 31'.

The ½ wavelength plate 31' is an optical element that allows a light beam incident from the polarizing beam splitter 30 to directly pass therethrough.

The relay lens 32 is an optical element that passes an image pattern provided on the reflective liquid crystal 40 serving as a spatial light modulator to pre-focus surface of the objective lens 35.

The pin hole 33 is an optical element that is used to decrease the diameter of a signal beam so as to cut off high-order diffraction light from the reflective liquid crystal 40.

The dichroic mirror 34 is an optical element that is used to equalize a light path of a beam used for recording and reconstruction (a laser beam from the recording and reconstructing light source 21) to a light path of a servo beam (a laser beam from the servo light source 43). Using the fact that the wavelength of the laser beam from the recording and reconstructing light source 21 is different from that from the servo light source 43, the dichroic mirror 34 allows the recording and reconstructing light beam from the recording and reconstructing light source 21 to pass therethrough and reflects the servo light beam from the servo light source 43.

The objective lens 35 is an optical element that is used to collect the signal beam and the reference beam onto the hologram recording medium 1.

The servo driving unit 36 is a driving mechanism that controls tracking and focusing of the objective lens 35 by driving the objective lens 35 in two axis directions on the basis of a tracking error signal and a focusing error signal from the light receiving element 49. The servo driving unit 36 includes coils 36A and 36B for driving the objective lens 35 in the two axis directions, respectively.

The ½ wavelength plate 37 for a reference light beam returns a reference light beam formed by the polarizing beam splitter 26 to a p-polarized light beam.

The pin hole 38 for a reference light beam is an optical element that is used to adjust the diameter of the reference beam that is returned to a p-polarized light beam by the ½ wavelength plate 37 for a reference light beam.

The galvanometer mirror 39 is a mirror that is used to modulate the angle of incidence of the reference light beam on the hologram recording medium 1.

The reflective liquid crystal 40 is a spatial light modulator that modulates the signal beam spatially (two-dimensionally in this embodiment) so as to overlay data. As well as the reflective liquid crystal, a Digital Micromirror Device (DMD) or a transmissive liquid crystal element, which is an element of a transmissive type, may be used as a spatial light modulator.

The magnification zoom lens 41 is an optical element that magnifies the reconstructed beam reflected by the polarizing beam splitter 30 and incident thereon.

The CCD camera 42 is a device to receive an image of the reconstructed beam.

The servo light source 43 is a light source that is used to control servos, such as a tracking servo and a focusing servo. The servo light source 43 emits a laser beam having a wavelength different from that of the recording and reconstructing light source 21. For example, the servo light source 43 is a laser diode, which has an oscillating wavelength having a small sensitivity to the hologram recording medium 1. For example, the servo light source 43 uses a wavelength of 650 nm. The collimating lens 44 is an optical element that converts laser beams emitted from the servo light source 43 to parallel laser beams.

The grating 45 is an optical element that divides a laser beam output from the collimating lens 44 into three laser beams. The grating 45 includes two elements. The laser beam is divided to perform a servo control.

The beam splitter 46 is an optical element that allows the laser beam output from the grating 45 to pass therethrough and reflects a returning beam reflected by the hologram recording medium 1.

The condenser lens 47 is an optical element that collects the returning beams from the beam splitter 46 onto the light receiving element 49.

The cylindrical lens 48 is an optical element that converts the shape of the beam output from the condenser lens 47 from a circular shape to an elliptical shape.

The light receiving element 49 is a device that receives the returning light beam and outputs a tracking error signal for controlling a tracking servo and a focus error signal for controlling a focusing servo. The light receiving element 49 includes, for example, a CCD.

The hologram recording medium 1 is rotated by a spindle motor (not shown). Since the hologram recording medium 1 moves, recording and playback are performed on the hologram recording medium 1 along tracks formed in a moving direction of the hologram recording medium 1.

The operation of the multi-angle hologram recording and reconstructing apparatus is now herein described.

A light beam having a wavelength λ emitted from the recording and reconstructing light source 21 is changed to parallel beams by the collimating lens 22. The parallel beams pass through the isolator 23 to prevent the returning beam. Thereafter, the ratio of p-polarized light beam to S-polarized light beam is adjusted by the ½ wavelength plate 24 and the beam is then divided into the p-wave signal beam line 61 and the s-wave reference beam line 62 by the polarizing beam splitter 26.

The intensity of a signal beam is adjusted by the ½ wavelength plate 27. Subsequently, only a p-polarized component of the beam is incident on the reflective liquid crystal 40 serving as a spatial light modulator via the polarizing beam splitter 28. Since a polarized light beam of the light beam modulated by the reflective liquid crystal 40 is rotated 90°, the polarized light beam is reflected by the polarizing beam splitter 28. The light beam reflected by the polarizing beam splitter 28 is returned to a p-polarized light beam again by the ½ wavelength plate 29. The p-polarized light beam passes through the polarizing beam splitter 30 and is then incident on the ½ wavelength plate 31'. The ½ wavelength plate 31' has a rotation angle that does not change the polarizing direction and allows the incident p-polarized light beam to directly pass therethrough. The light beam is then propagated through the relay lens 32. At that time, high-order diffracted light from the reflective liquid crystal 40 is cut off by the pin hole 33.

Subsequently, the signal light beam passes through the dichroic mirror 34. The signal light beam is then collected by the objective lens 35 and is incident on the hologram recording medium 1.

In contrast, a reference light beam formed by the polarizing beam splitter 26 is returned to a p-polarized light beam by the ½ wavelength plate 37. The diameter of the p-polarized light beam is adjusted by the pin hole 38. Additionally, the galvanometer mirror 39 and a pair of relay lenses downstream of the galvanometer mirror 39 modulate the angle of incidence of the reference light beam on the hologram recording medium 1. The reference light beam is incident on the same location of the hologram recording medium 1 as that of the signal light beam so as to interfere with the signal light beam. As a result, interference fringes are formed on the hologram recording medium 1. At that time, information spatially modulated by the reflective liquid crystal 40 is recorded in the form of a hologram on the hologram recording medium 1.

Here, by changing the angle of the galvanometer mirror 39, the angle of incidence on the hologram recording medium 1 can be changed, and therefore, angle multiplexing recording can be performed.

During reconstruction, a light beam whose wavelength is offset by $\Delta\lambda$ from a wavelength $\lambda$ used for the recording is emitted from the recording and reconstructing light source 21. Here, $\Delta\lambda$ is a value that satisfies the above-described conditions. At that time, the signal light beam is blocked and only the reference light beam is incident on the hologram recording medium 1. By using an angle of incidence of the reference light beam that is the same as that used during recording, the recorded signal can be reconstructed.

When the reference light beam is incident on the hologram recording medium 1, a diffracted light beam (reconstructed light beam) is generated from a hologram recorded on the hologram recording medium 1. The reconstructed light beam travels along the optical path of the signal beam in the opposite direction. The reconstructed light beam passes through the objective lens 35, the dichroic mirror 34, and the relay lens 32. While passing through the relay lens 32, noise is removed by the pin hole 33. Subsequently, the reconstructed light beam enters the ½ wavelength plate 31'. Unlike the operation during recording, the ½ wavelength plate 31' rotates the polarizing direction 90° to change a p-polarized light beam to an S-polarized light beam. The s-polarized light beam is reflected by the polarizing beam splitter 30 and the magnification of the s-polarized light beam is then adjusted by the magnification zoom lens 41. Thereafter, the light beam is converted to an electrical signal corresponding to spatial two-dimensional data on the reflective liquid crystal 40 by the CCD camera 42. The output of the CCD camera 42 is digitized by a signal processing unit (not shown) into time-series binary data.

It should be noted that, in the angle multiplexing recording, since the angle of incidence of a reference light beam is changed, the spacing between the diffraction gratings is also changed. Accordingly, the degree of effect caused by the wavelength shift of the beam is changed, and therefore, the amount of the positional shift of an image is also changed on the CCD camera 42. Consequently, the amount of the positional shift of an image on the CCD camera 42 for each angle of incidence is measured in advance. The amount of the positional shift of an image is changed in accordance with the angle of incidence of the reference light beam during recording and reconstruction. Thus, the positional shift of an image on the CCD camera 42 depending on the angle of incidence of the beam caused by the wavelength shift can be prevented in the angle multiplexing recording mode.

According to the hologram recording and reconstructing apparatuses of the above-described embodiments, by reconstructing information using a beam having a wavelength that is shifted from that used during recording (i.e., a wavelength between the wavelength selectivity of a transmission hologram and the wavelength selectivity of a reflection hologram), the occurrence of a diffracted light beam from a reflection hologram can be prevented so that only a diffracted light beam from a transmission hologram can be obtained. This results in the improvement of the SNR.

An exemplary laser light source apparatus capable of changing the wavelength of its output light beam is now herein described.

Figure 8:
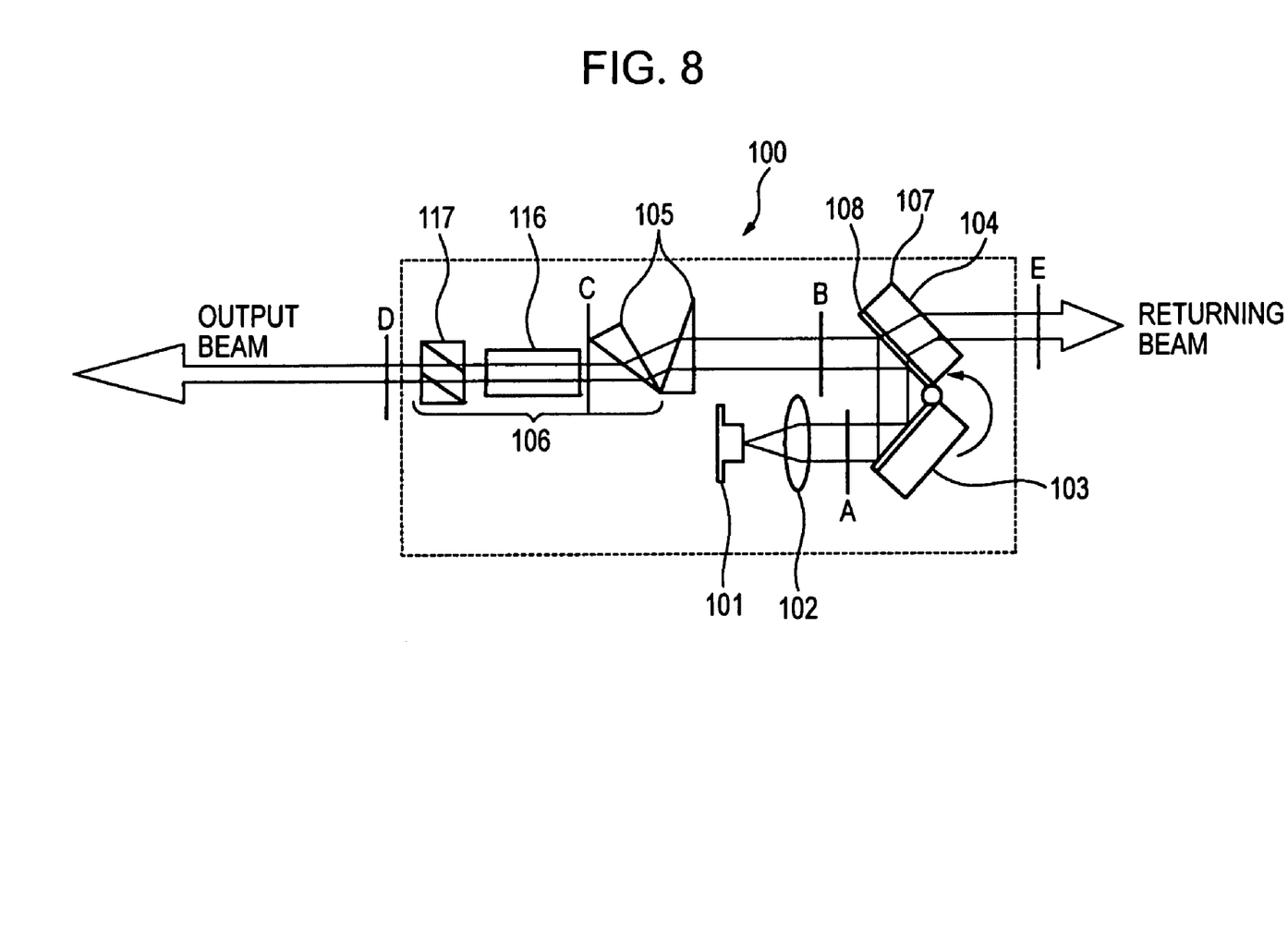
FIG. 8 is a schematic block diagram of a laser light source apparatus capable of changing the wavelength of its output light beam.

FIG. 8 is a schematic block diagram of the laser light source apparatus. As shown in FIG. 8, a laser light source apparatus 100 includes a laser diode 101, a collimating lens 102, a diffraction grating 103, a polarizing beam splitter 104, an anamorphic prism 105, and an isolator 106.

The laser diode 101 emits a multi-mode laser beam. For example, the laser diode 101 emits a blue laser beam having a wavelength of about 410 nm. The collimating lens 102 changes the laser beam emitted from the laser diode 101 into parallel light. The diffraction grating 103 generates a first order beam in a direction that depends on the wavelength. The angle between the diffraction grating 103 and the laser diode 101 is determined so that the first order beam of a specific wavelength (e.g., 410 nm) is returned to the laser diode 101. Thus, only a component of the wavelength increases in the laser diode 101 so that the laser beam becomes a single-mode laser beam. Almost all the laser beams emitted from the laser diode 101 are the zeroth order beam, not the first order beam, and therefore, the laser beam is reflected by the diffraction grating 103, like a mirror. That is, the laser light source apparatus 100 is basically a Littrow external resonator laser. The polarizing beam splitter 104 is formed by forming a polarizing film 108 on a surface of a transparent glass 107. The polarizing beam splitter 104 reflects the zeroth order beam reflected by the diffraction grating 103 in a predetermined direction other than the direction towards the diffraction grating 103, while the polarizing beam splitter 104 allows a beam having a polarizing direction rotated 90° from the polarizing direction of the zeroth order beam to pass therethrough. The isolator 106 includes a rotator 116 and a polarizing beam splitter 117 to prevent an external laser beam (reflected beam) from entering inside the laser light source apparatus 100.

The laser light source apparatus 100 having such a structure can change the wavelength of a blue laser beam (e.g., about 410 nm) by about 5 to 10 nm by rotating the diffraction grating 103.

However, according to an embodiment of the present invention, the wavelength variable laser light source is not limited to a laser light source of the above-described type. A laser light source of a variety of types may be used.

It should be understood by those skilled in the art that various modifications, combinations, sub-combinations and alterations may occur depending on design requirements and other factors insofar as they are within the scope of the appended claims or the equivalents thereof.

The invention claimed is:

1. A holographic recording and reconstructing apparatus, comprising:
   a laser light source for emitting a laser beam;
   a beam splitting element for splitting the emitted laser beam into a signal beam and a reference beam;
   a light modulating element for modulating the signal beam;
   an optical system for collecting the modulated signal beam and the reference beam onto a reflection hologram recording medium at substantially the same location;
   a light detection element for detecting a reconstructed light beam from the hologram recording medium; and
   wavelength shifting means for shifting the wavelength of the laser beam used during reconstruction from the wavelength used during recording by a shift amount $\Delta\lambda$.

2. The holographic recording and reconstructing apparatus according to claim 1, wherein the shift amount $\Delta\lambda$ satisfies the following relation:

$$(-\lambda_0^2/(\lambda_0+2nL\cos\theta))<\Delta\lambda<((-\lambda_0^2\cos\theta)/(\lambda_0\cos\theta+2nL\sin^2\theta))$$

where $\lambda_0$ is the wavelength of the laser beam used during recording, $\theta$ is the angle of incidence of the reference beam, L is the thickness of the hologram recording medium, and n is the index of refraction of the hologram recording medium.

3. The holographic recording and reconstructing apparatus according to claim 1, wherein the light detection element is disposed while being spatially shifted in accordance with the shift amount $\Delta\lambda$.

4. The holographic recording and reconstructing apparatus according to claim 1, wherein a margin of the number of pixels of the light detection element is set in accordance with the shift amount $\Delta\lambda$.

5. The holographic recording and reconstructing apparatus according to claim 1, further comprising:
   means for changing the angle of the reference beam; and
   means for moving the light detection element in accordance with the angle of incidence of the beam incident on the hologram recording medium during reconstruction.

6. A method for recording and reconstructing a hologram, comprising:
   emitting a laser beam from a laser light source;
   splitting the emitted laser beam into a signal beam and a reference beam;
   modulating the signal beam;
   collecting the modulated signal beam and the reference beam onto a reflection hologram recording medium at substantially the same location;
   detecting a reconstructed light beam from the hologram recording medium; and
   shifting the wavelength of the laser beam used during reconstruction from the wavelength used during recording by a shift amount $\Delta\lambda$.

7. The method for recording and reconstructing a hologram according to claim 6, wherein the shift amount $\Delta\lambda$ satisfies the following relation:

$$(-\lambda_0^2/(\lambda_0+2nL\cos\theta))<\Delta\lambda<((-\lambda_0^2\cos\theta)/(\lambda_0\cos\theta+2nL\sin^2\theta))$$

where $\lambda_0$ is the wavelength of the laser beam used during recording, $\theta$ is the angle of incidence of the reference beam, L is the thickness of the hologram recording medium, and n is the index of refraction of the hologram recording medium.

8. The method for recording and reconstructing a hologram according to claim 6, further comprising:
   moving the light detection element in accordance with the angle of incidence of the beam onto the hologram recording medium when reconstructing information recorded on the hologram recording medium in an angle multiplexing mode.

9. A holographic recording and reconstructing apparatus, comprising:
   a laser light source configured to emit a laser beam;
   a beam splitting element configured to split the emitted laser beam into a signal beam and a reference beam;
   a light modulating element configured to modulate the signal beam;
   an optical system configured to collect the modulated signal beam and the reference beam onto a reflection hologram recording medium at substantially the same location;
   a light detection element configured to detect a reconstructed light beam from the hologram recording medium; and
   a wavelength shifting unit configured to shift the wavelength of the laser beam used during reconstruction from the wavelength used during recording by a shift mount $\Delta\lambda$.

* * * * *

UNITED STATES PATENT AND TRADEMARK OFFICE
CERTIFICATE OF CORRECTION

PATENT NO. : 7,248,389 B2
APPLICATION NO. : 11/325037
DATED : July 24, 2007
INVENTOR(S) : Mitsuru Toishi It is certified that error appears in the above-identified patent and that said Letters Patent is hereby corrected as shown below:

In Column 2, Line 7, delete "an";

In Column 2, Line 38, insert --a-- immediately after "at";

In Column 15, Line 20, "$\Delta\lambda sat$-" should read --$\Delta\lambda$ sat- --; and In Column 16, Line 45, "mount" should read --amount--.

Signed and Sealed this

Seventeenth Day of June, 2008

JON W. DUDAS
*Director of the United States Patent and Trademark Office*